(12) United States Patent
Janning

(10) Patent No.: US 7,555,884 B2
(45) Date of Patent: Jul. 7, 2009

(54) SELF-PROPELLED HARVESTING MACHINE WITH A FRONT HARVESTING ATTACHMENT THAT CAN BE PIVOTED ABOUT A VERTICAL AXIS

(75) Inventor: Thomas Janning, Ochtrup (DE)

(73) Assignee: Deere & Company, Moline, IL (US)

( * ) Notice: Subject to any disclaimer, the term of this patent is extended or adjusted under 35 U.S.C. 154(b) by 18 days.

(21) Appl. No.: 11/623,586

(22) Filed: Jan. 16, 2007

(65) Prior Publication Data
US 2008/0028735 A1   Feb. 7, 2008

(30) Foreign Application Priority Data
Jan. 16, 2006   (DE) ................. 10 2006 002 053

(51) Int. Cl.
*A01D 75/26*   (2006.01)
(52) U.S. Cl. ........................ 56/15.4; 56/14.9; 56/15.5
(58) Field of Classification Search ............... 56/10.4, 56/14.7, 14.9, 15.1–15.6, 503, 169–172, 56/212–214, 221, 288, DIG. 14; 37/234, 37/283
See application file for complete search history.

(56) References Cited

U.S. PATENT DOCUMENTS

| | | | | |
|---|---|---|---|---|
| 2,579,957 A | * | 12/1951 | Pearne | ................. 56/123 |
| 3,669,194 A | * | 6/1972 | Zurek | ................. 172/280 |
| 4,663,921 A | | 5/1987 | Hagstrom et al. | |
| 4,715,172 A | * | 12/1987 | Mosby | ................. 56/228 |
| 4,761,016 A | * | 8/1988 | Groud | ................. 280/467 |
| 5,299,821 A | * | 4/1994 | Hurlburt | ................. 280/503 |
| 6,012,272 A | * | 1/2000 | Dillon | ................. 56/14.6 |
| 6,318,058 B1 | * | 11/2001 | Emmert | ................. 56/14.6 |
| 2006/0277885 A1 | | 12/2006 | Rauch | |

FOREIGN PATENT DOCUMENTS

| | | |
|---|---|---|
| DE | 29519842 | 3/1996 |
| DE | 19620070 | 2/1997 |
| DE | 10326367 | 2/2005 |
| EP | 1269823 | 1/2003 |
| FR | 2427774 | 6/1979 |
| JP | 2004201580 | 7/2004 |

* cited by examiner

Primary Examiner—Alicia M Torres

(57) ABSTRACT

The invention concerns a self-propelled agricultural harvesting machine that can be propelled in a normal forward operating direction and is provided with a chassis that includes a pair of front devices in contact with the ground, a pair of rear devices in contact with the ground arranged behind the front pair of devices in contact with the ground relative to the normal forward operating direction and that can be steered by a steering actuator, and a harvested crop processing arrangement arranged within the chassis and an intake conveyor arranged on the front side of the chassis on whose front side a front harvesting attachment take-up arrangement is arranged to which a front harvesting attachment can be attached or is attached in order to take up harvested crop that can be conducted by the intake conveyor to the harvested crop processing arrangement during the harvesting operation.

8 Claims, 6 Drawing Sheets

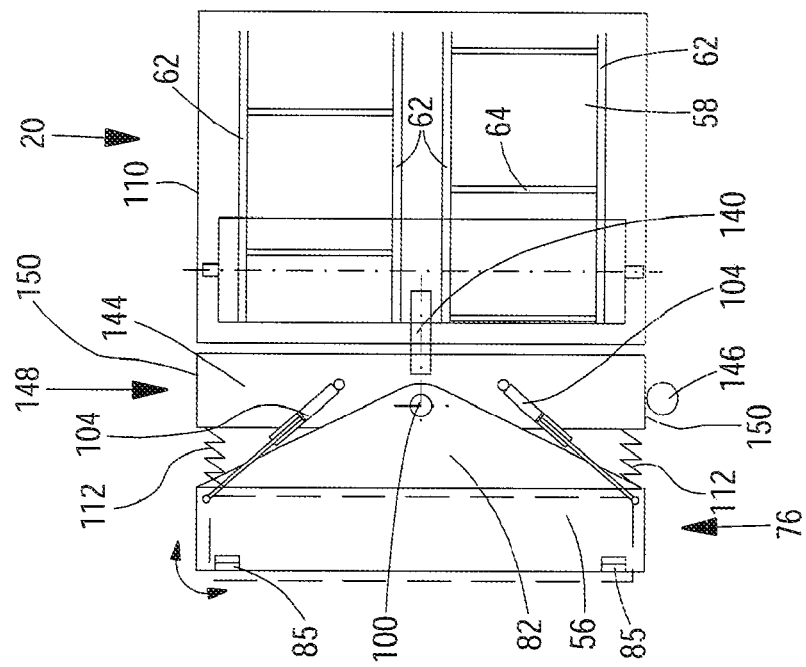
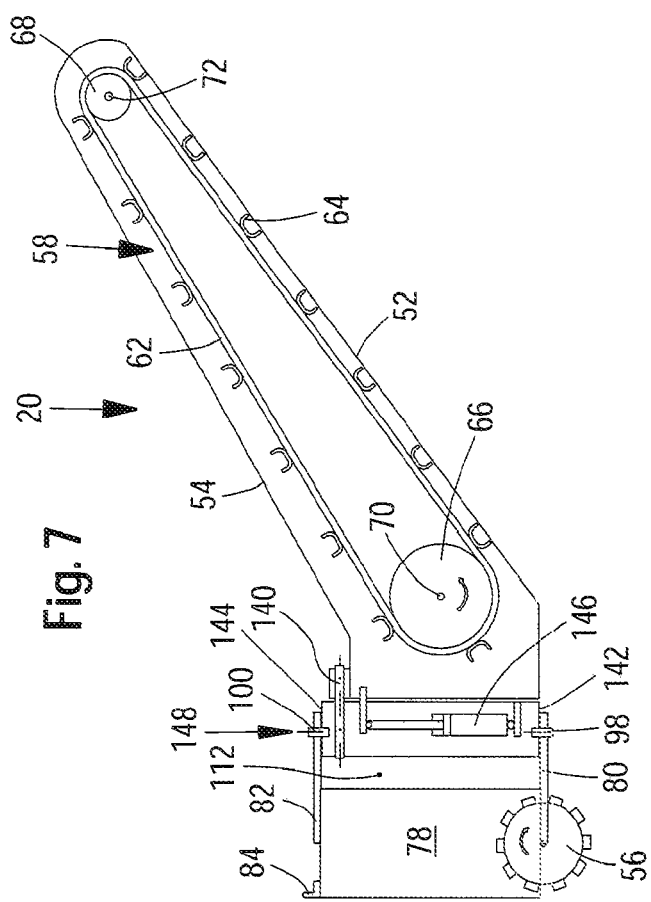

SELF-PROPELLED HARVESTING MACHINE WITH A FRONT HARVESTING ATTACHMENT THAT CAN BE PIVOTED ABOUT A VERTICAL AXIS

This invention claims priority under 35 USC 119 to German Patent Application No. DE 10 2006 002 05053.7, which was filed Jan. 16, 2006, by Thomas Janning.

FIELD OF THE INVENTION

The invention concerns a self-propelled agricultural harvesting machine, that can be propelled in a normal forward operating direction and is provided with a chassis that includes a harvested crop processing arrangement arranged within the chassis and an intake conveyor arranged on the front side of the chassis, on whose front side a harvested crop take-up arrangement is arranged to which a front harvesting attachment to take up harvested crop can be attached or is attached, that can be supplied during the harvesting operation by the intake conveyor of the harvested crop processing arrangement.

BACKGROUND OF THE INVENTION

Many types of self-propelled agricultural harvesting machines include a chassis that is equipped with driven front wheels and steerable rear wheels. Examples of these types include combines and forage harvesters. A front harvesting attachment is attached to the front side of the chassis of the harvesting machine for taking up the harvested crop lying or standing on a field, that delivers the harvested crop during the harvesting operation to an intake conveyor connected to the chassis, that is designated in combines as a slope conveyor and in forage harvesters as intake housing. The intake conveyor brings the harvested crop into the interior of the chassis in which harvested crop processing arrangements are arranged, these include threshing, separating and cleaning arrangements in combines and chopper assemblies in forage harvesters.

In many cases the front harvesting attachments are removable, but are otherwise rigidly attached to the intake conveyor. In order to conform to the contour of the ground the intake conveyor is usually fastened, free to pivot about an axis extending horizontally and transverse to the forward operating direction with respect to the chassis of the harvesting machine, by means of an actuator. An appropriate control arrangement detects the height of the front harvesting attachment above the ground by means of a sensor and controls the actuator in such a way that a desired height or a desired contact pressure of the front harvesting attachment on the ground is attained. In addition, the control arrangement can pivot the front harvesting attachment about an axis extending horizontally and in the forward operating direction of the harvesting machine relative to the intake conveyor (EP 1 269 823 A), which is useful, for example, with slope combines with automatic horizontal orientation of the chassis with wheels, adjustable in their height, in an operation on a side slope. It has also been proposed that the front harvesting attachment be pivoted automatically about an axis extending horizontally and transverse to the direction of operation relative to the intake conveyor (DE 295 119 842 U) in order to attain an optimum cutting angle of the mowing knives relative to the harvested crop at all times. Accordingly front harvesting attachments that can be pivoted about horizontal axes relative to the intake conveyor are fundamentally known.

Since in the state of the art the front harvesting attachments cannot be moved about the vertical axis relative to the intake conveyor or the chassis of the harvesting machine, they follows the movement in the steering direction of the steered rear wheels of the harvesting machine together with the chassis. With larger operating widths of the front harvesting attachment the outer ends of the front harvesting attachment are very far from the center between the front wheels of the harvesting machine, not only in the transverse direction but also in the forward direction. This distance results in a very large possible radius of the outer end of the front harvesting attachment, so that it is relatively difficult to maneuver the harvesting machine during the free cutting of the radius ahead of the turn in the headlands of the field. In order to free cut the corners it may become necessary under certain circumstances, to perform several forward and reverse passes of the harvesting machine, these are accompanied by a great loss of time.

Moreover, harvesting machines with center pivot steering are known (U.S. Pat. No. 4,663,921 A, DE 103 26 367 A), that are provided with a chassis divided into two halves with a front half and a rear half that are fastened to each other so as to pivot about a vertical axis. Each of the halves is provided with wheels attached rigidly on each side, that is, the wheels cannot be steered. The movement of the halves about the vertical axis produced by means of a steering cylinder defines the direction of operation of the harvesting machine. The front half of the chassis carries a front harvesting attachment. Due to the center pivot steering the imaginary axis of rotation, about which the front harvesting attachment rotates when steered, is offset somewhat towards the front compared to harvesting machines with one-piece chassis, however, this difference is not clearly noticeable with respect to the possible outer radius at the end of the front harvesting attachment. In addition, a rather high cost is entailed when harvested crop is to be transported from the front half of the chassis to the rear half of the chassis.

For mowing vehicles with several mowing units arranged side by side alongside each other it has been proposed (FR 2 427 774 A, DE 196 20 070 A) that the center mowing unit, that is attached to the front side of the mowing vehicle, be shifted to the side depending on the immediate steering angle of the mowing vehicle, or pivoted about the vertical axis, in order to cover to the side of the strips mowed by the individual mowing units, even during operation around a curve. With such mowing vehicles the harvested crop is not brought into the interior of the mowing vehicle.

JP 2004 201 580 A describes a combine in which the cutter head can be pivoted to the side about the vertical axis in order to provide a better access to the front side of the combine for maintenance purposes.

The purpose of the invention is seen in the need to provide a self-propelled harvesting machine with steerable rear wheels or other propulsion devices, that can be maneuvered on a field without any problems.

SUMMARY OF THE INVENTION

This purpose is solved, according to the invention, by the teaching of patent claim 1, where the further patent claims cite characteristics that further develop the solution to great advantage.

The harvesting machine is provided with a chassis that is supported on the ground. A harvested crop processing arrangement is arranged within the chassis, and is used for the processing of the harvested crop. In a combine the harvested crop processing arrangement includes threshing, separating and cleaning arrangements and in a forage harvester, chopper assemblies, and, if necessary, kernel processors and post-chopper accelerators. An intake conveyor is located on the front side of the chassis, it includes at its front side a harvested crop take-up arrangement to which a front harvesting attachment can be attached or is attached so that it can be removed. During the harvesting operation the front harvesting attachment takes up harvested crop lying or standing on a field and delivers it to the intake conveyor that brings it to the harvested crop processing arrangement. The harvested crop take-up arrangement is connected in joints, free to pivot, relative to the chassis of the harvesting machine about an at least approximately vertical axis. The pivoting of the front harvesting attachment take-up arrangement and with it also the front harvesting attachment about the at least approximately vertical axis is performed by a front harvesting attachment pivoting actuator.

In this way the front harvesting attachment can be automatically pivoted about the vertical axis with respect to the chassis. Thereby a considerably smaller radius of the outer end of the curve of the front harvesting attachment can be attained, which improves the maneuverability of the combination of the harvesting machine and the front harvesting attachment. As a result corners of the field can be free-cut considerably more easily than front harvesting attachments attached rigidly to the chassis.

It would be conceivable to attach the intake conveyor to the chassis of the harvesting machine so as to pivot about the vertical axis and to attach the front harvesting attachment take-up arrangement rigidly to the intake conveyor. However, this would require a movable connection point in a rather poorly accessible area at the harvested crop intake of the chassis. An obvious solution would therefore be to connect joints the front harvesting attachment take-up arrangement to the intake conveyor so as to pivot about the vertical axis. Then the intake conveyor is either connected rigidly with the chassis (so that it cannot pivot about the vertical axis) or it is provided with further connections pivoting about the vertical axis in itself and/or at its connecting point to the chassis with further connections to pivot about the vertical axis, so that only one partial region of the total pivot angle of the front harvesting attachment take-up arrangement relative to the chassis can be associated with each of these connecting points. This arrangement has the advantage that only smaller vertical pivot angles occur at the connecting points, which avoids or neutralizes possible transfer problems during the transport of the harvested crop. Then a single front harvesting attachment pivoting actuator can be attached between the chassis and the front harvesting attachment take-up arrangement in order to cover the entire pivoting angle or each of the connecting points is associated with its own separate front harvesting attachment pivoting actuator, each of which covers its own partial region of the total pivoting angle. In the second case, the front harvesting attachment pivoting actuators can be actuated successively, one after another, that is, a second front harvesting attachment pivoting actuator is moved only after the front harvesting attachment has been pivoted through an angle exceeding the angular region of a first front harvesting attachment pivoting actuator, or they are actuated simultaneously so that the pivoting angle is distributed at all times over several front harvesting attachment pivoting actuators.

In order to avoid problems in the transfer between the front harvesting attachment and the intake conveyor in the case of a front harvesting attachment pivoted about the vertical axis, an obvious solution is to equip the intake conveyor with a first conveyor and a second conveyor that is arranged downstream of the first conveyor. The first conveyor is preferably a roll, particularly a paddle roll, with an axis of rotation extending horizontally and transverse to the forward direction, while the second conveyor preferably is a chain conveyor with drivers, that is usually applied in slope conveyors of combines. The first conveyor can be configured as a double conical (drum shape) shape. On the other hand, in forage harvesters, the first conveyor can be assembled from conveyor drums with vertical axis of rotation arranged on the outside of the intake conveyor, between the conveyor drums a further conveyor drum with a horizontal axis of rotation extending transverse to the forward direction may be arranged at the bottom and/or at the upper side of the intake conveyor, while the second conveyor is preferably assembled of rough-pressing rolls, that are known in themselves.

In a possible embodiment of the invention the front harvesting attachment take-up arrangement is connected to a side wall extending to the rear that is in contact with the inside or the outside of a side wall of the intake conveyor. The two side walls move relative to each other when the front harvesting attachment take-up arrangement is pivoted about the vertical axis and form a kernel- and dust tight seal between the front harvesting attachment take-up arrangement and the intake conveyor. Due to the pivoting movement at least one of the side walls must be provided with a radius whose center coincides with the center of gravity of the front harvesting attachment take-up arrangement or it must be flexible in itself. In another embodiment an expansion bellows is arranged between the front harvesting attachment take-up arrangement and a side wall of the intake conveyor that is rigid in itself in order to attain a seal against kernels and dust between the front harvesting attachment take-up arrangement and the intake conveyor.

In an advantageous embodiment of the invention the chassis of the harvesting machine is provided with a pair of front devices in contact with the ground and a pair of rear devices in contact with the ground. As a rule these devices are wheels or track laying chains. The rear devices that may be one or two wheels or track laying chain are arranged to the rear behind the front devices in the normal operating direction of the harvesting machine, in which they are moved across a field in the harvesting operation, and they are arranged behind the front devices and can be steered by a steering actuator, that is, they are attached so as to rotate about a vertical axis or, in the case of track laying chains, they can be driven at different speeds, in order to be able to steer the harvesting machine, that is, in order to provide the direction of operation as input. The front harvesting attachment pivoting actuator can preferably be coupled so as to be driven together with the steering actuator, that is, the drive of the front harvesting attachment pivoting actuator can (selectively or permanently) be coupled or linked with the drive of the steering actuator in such a way that the front harvesting attachment pivoting actuator is automatically activated upon a steering movement of the steering actuator. Thereby separate input devices for an operator for the control of the front harvesting attachment pivoting actuator can be omitted. The steering actuator and the front harvesting attachment pivoting actuator are preferably connected to a common control arrangement.

The input for the immediate steering angle can be provided by an operator controlled input device, particularly in the form of a steering wheel or a joystick, or it can be provided by a wireless remote steering arrangement or by means of an automatic steering control, based on a plan of the path of the machine stored in memory and information regarding the actual position of the harvesting machine and/or an optical detection and/or mechanical detection of the edge of the harvested crop. The control arrangement controls the steering actuator in such a way that the harvesting machine moves in the desired direction. The front harvesting attachment pivoting actuator can be coupled permanently to the steering actuator so that it moves together with the steering actuator at all times, particularly in such a way that an opposite movement results between the front harvesting attachment and the rear devices in contact with ground, which results in the described reduction in the radius of the outermost end of the front harvesting attachment. In a preferred embodiment of the invention, however, the front harvesting attachment pivoting actuator is not coupled permanently to the steering actuator but the connection can be turned off so that the movement of the front harvesting attachment take-up arrangement can be stopped in cases in which it is unnecessary or even harmful, for example, during operation on public roads. For this purpose an input arrangement can be provided in which the front harvesting attachment pivoting actuator is permanently brought into its rest position, according to a corresponding input, in which the front harvesting attachment is oriented transverse to the forward direction. This rest position, in particular, is controlled automatically when a field operation/public road operation switch is brought into the position for an operation on public roads. The input arrangement may also include a third position in which the front harvesting attachment take-up arrangement and the rear devices in contact with the ground are pivoted in the same direction about the vertical axis in order to attain a sort of crab steering in which unfavorably situated sections of the field can be harvested.

The steering arrangement, according to the invention, is appropriate for all types of self-propelled harvesting machines, such as combines, forage harvesters, cotton pickers or self-propelled balers.

BRIEF DESCRIPTION OF THE DRAWINGS

The drawings show two embodiments of the invention that shall be described in greater detail in the following.

FIG. 6 shows a plan view of the forward region of the intake conveyor with a front harvesting attachment take-up arrangement fastened to it so as to pivot about a horizontal axis extending in the forward direction according to a second embodiment of the invention.

FIG. 7 shows a side view of the intake conveyor according to FIG. 6.

DESCRIPTION OF THE PREFERRED EMBODIMENT

Figure 1:
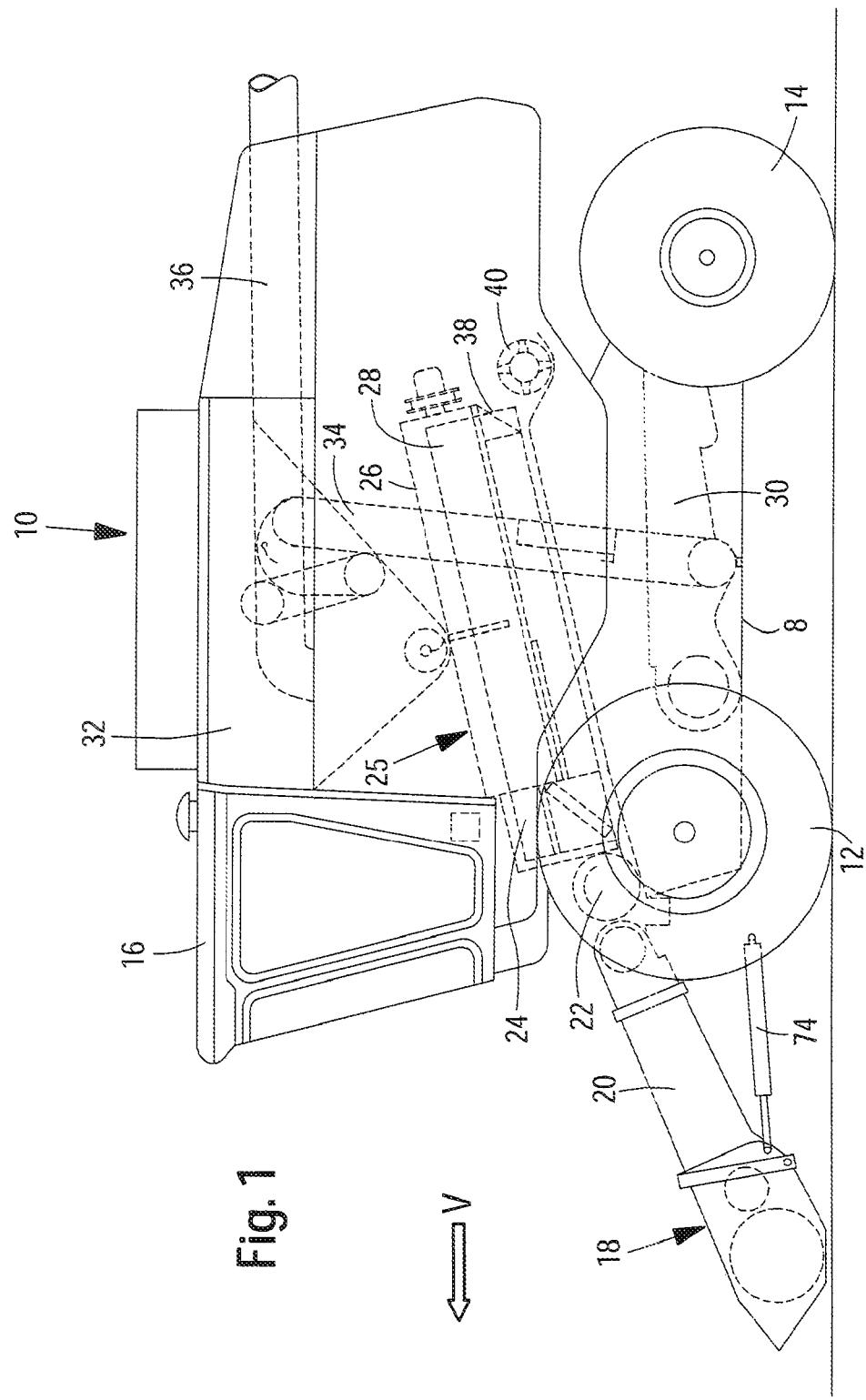
FIG. 1 shows a side view of a self-propelled harvesting machine.

A harvesting machine 10 in the form of a combine, shown n FIG. 13 includes a chassis 8 that is carried on two front driven devices 12 in contact with the ground in the form of wheels and two rear steerable devices 14 in contact with the ground in the form of wheels and is provided with an operator's cab 16 from which the harvesting machine 10 can be controlled by an operator. During the harvest and during operation on public roads the harvesting machine 10 is propelled in the normal forward direction V defined by the direction of sight of the operator in the operator's cab 16. It can, however, be temporarily operated in reverse, for example, in order to turn.

A front harvesting attachment 18 in the form of a cutter head is used to take up harvested crop and to conduct it to an intake conveyor 20 in the form of a slope conveyor. The harvested crop is conducted to a guide drum 22 by the intake conveyor 20. The guide drum 22 guides the harvested crop upwards through an intake transfer region 24 on a harvested crop processing arrangement 25 in the form of an axial separating arrangement. The harvested crop processing arrangement 25 includes a cylindrical rotor housing 26 and a rotor 28 arranged in the rotor housing 26.

The harvested crop processing arrangement 25 threshes and separates the harvested crop. Grain and chaff fall through grates on the floor of the harvested crop processing arrangement 25 into a cleaning system 30 that also is a part of the harvested crop processing arrangement 25. The cleaning system 30 removes the chaff and conducts the cleaned corn to a grain elevator 34. The grain elevator 34 deposits the grain in a grain tank 32. The cleaned grain in the grain tank 32 can be unloaded by an unloading screw conveyor 36 into a trailer or truck. The threshed straw, separated from the grain, is conducted out of the axial separating arrangement through an outlet 38 to a delivery drum 40. The delivery drum 40 ejects the straw at the rear end of the harvesting machine 10. It could also conduct the straw to a straw chopper (not shown) that chops it and distributes it over the field across the width of the cut of the front harvesting attachment 18. The components of the harvesting machine that can be driven are driven by an internal combustion engine.

In the following the directions such as front, rear, upward, downward are stated relative to the normal forward operating direction V.

Figure 2:
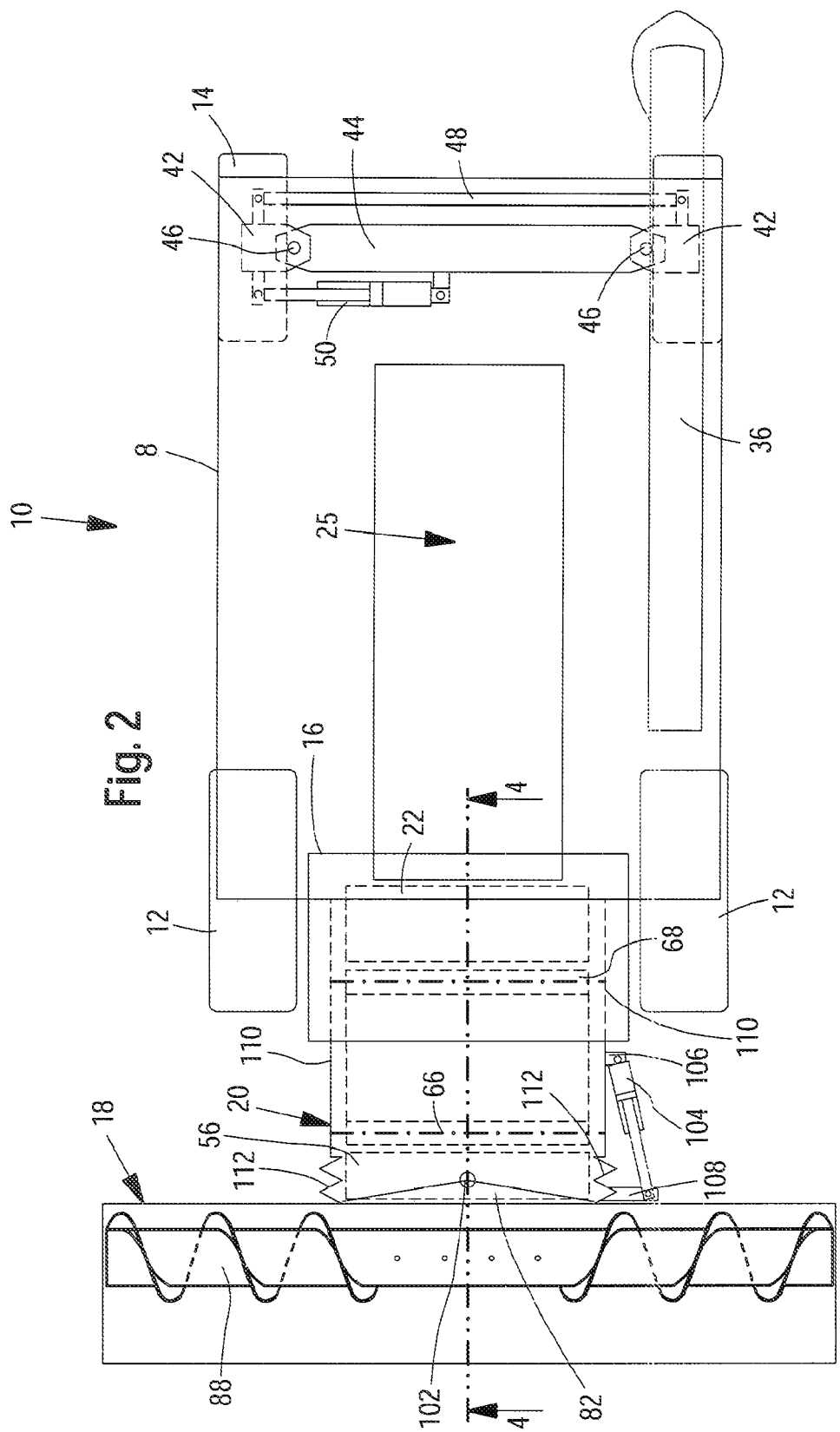
FIG. 2 shows the harvesting machine of FIG. 1 in a plan view with the rear steerable devices and the front harvesting attachment in rest position.
Figure 3:
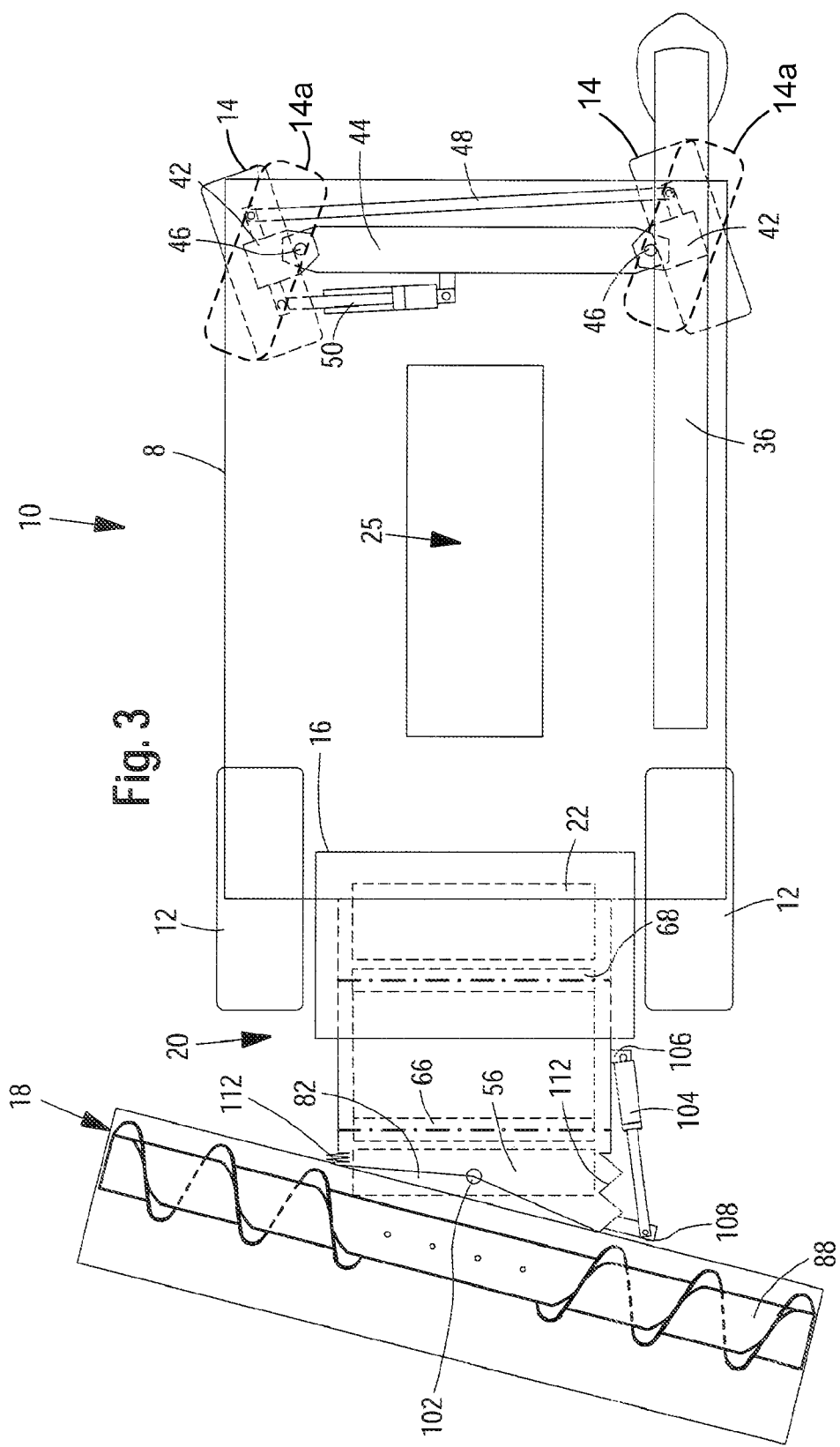
FIG. 3 shows a plan view of FIG. 2 with rear steerable devices repositioned to the left and the front harvesting attachment pivoted to the right about the vertical axis.

FIG. 2 shows a plan view of the harvesting machine 10. The rear devices 14 include wheel retainers 42 that are fastened to full-floating axles 44, free to pivot about a vertical axis 46. The full-floating axle 44 is connected at its center in joints to the chassis 8 and pivoted about a horizontal axis extending in the forward direction V, not shown. The wheel retainers 42 are connected to each other at a distance to the axis 46 by a track rod 48. A steering actuator 50, configured as a hydraulic cylinder, is connected with its housing to the full-floating axle 44 and with its piston rod to a wheel retainer 42. Thereby the rear devices 14 can be rotated in the same direction about the axis 46, as is shown in FIG. 3, in order to steer the harvesting machine 10 in the desired direction. In place of a hydraulic cylinder for the steering actuator 50 a rotating hydraulic motor or an electric motor or a pneumatic cylinder could also be used.

Figure 4:
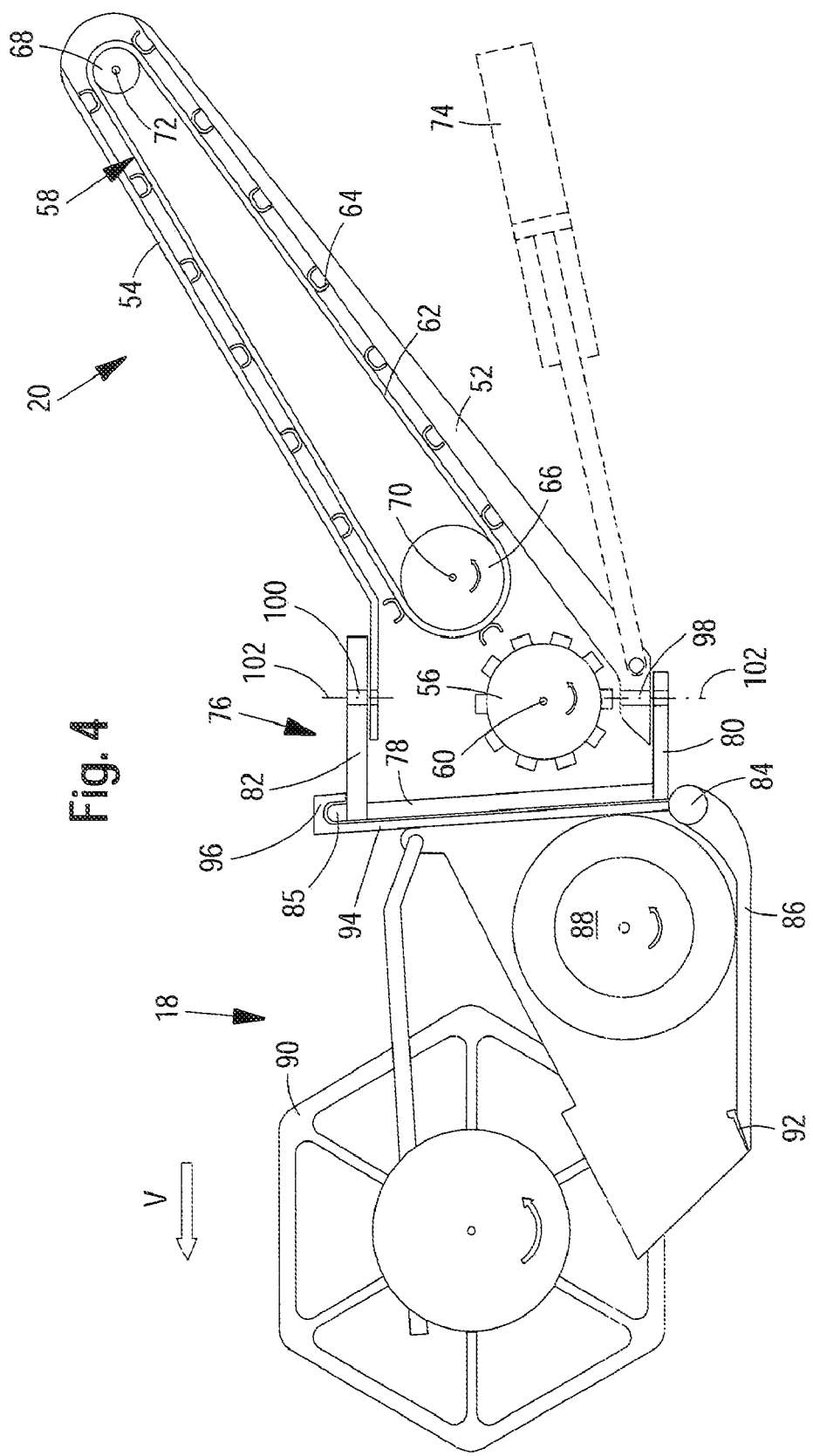
FIG. 4 shows a vertical section through the front harvesting attachment and the intake conveyor of the harvesting machine along the line 4-4 of FIG. 2.

Reference will now be made to FIG. 4 in which the intake conveyor 20 and the front harvesting attachment 18 are shown in greater detail in a vertical section. The intake conveyor 20 includes a housing with lower walls 52 and upper walls 54 in which a first conveyor 56 and a second conveyor 58 are arranged. The first conveyor 56 is configured in the form of a roll driven in rotation with drivers (for example, paddles), it rotates about a horizontal axis 60 that extends transverse to the forward direction. The second conveyor 58 is located downstream of the first conveyor 56 and includes several conveyor chains 62, arranged to the side alongside each other, that circulate about a lower roll 66 and an upper roll 68, they carry driver moldings 64 fastened to the outside of the chains. The lower roll 66 and/or the upper roll 68 are connected to a drive that preferably drives, in addition, the elements of the front harvesting attachment 18 that can be driven, and as a rule they are driven by means of an articulated shaft that is variable in its length. The axes of rotation 70, 72 of the rolls 66, 68 extend parallel to the axis 60. The intake conveyor 20 is connected in joints to the chassis 8, free to rotate about the axis of rotation 72 of the upper roll 68. A height adjustment actuator 74 in the form of a hydraulic cylinder (see FIG. 1) extends between the chassis 8 and the front end of the intake conveyor 20 in order to bring the height of the front harvesting attachment 18 above the ground or its contact pressure to a certain value by means of an appropriate control arrangement. A second, identical height adjustment actuator 74 can also be arranged on the other side of the intake conveyor 20.

A front harvesting attachment take-up arrangement 76 is arranged on the front side of the intake conveyor 20, it includes a frame with two vertical carriers 78 arranged on each side of a central transfer outlet for the harvested crop, a horizontal lower sheet metal floor 80, and a horizontal upper sheet metal cover 82 —that is triangular in the plan view FIG. 2 —as is the lower sheet metal floor 80. Two bridges 85 projecting upward are arranged on the front upper side of the upper sheet metal cover 82, see also FIG. 6.

The front harvesting attachment 18 includes a lower carrier pipe 84 extending horizontally and transverse to the forward direction, to which a lower trough 86 extending forward is fastened, on whose front side a cutter bar 92 is provided and a transverse screw conveyor 88 is arranged above the trough, a reel 90 is located above it. A vertical carrier 94 extends upward from the carrier pipe 84, on its upper side hooks 96 are attached that a reach over the bridge 85. Further locking arrangements can be provided between the carrier pipe 84 and the lower sheet metal floor 80 of the front harvesting attachment take-up arrangement 76. Hence the front harvesting attachment 18 is attached to the front harvesting attachment take-up arrangement 76 so that it can be removed, it forms a central penetration opening through which the harvested crop can reach the first conveyor 56 from the front harvesting attachment 18. In contrast to the illustration shown in FIG. 4, the first conveyor 56 (or even a third conveyor, not shown, that preferably corresponds in its configuration to the first conveyor) could also be fastened to the front harvesting attachment take-up arrangement 76 and move with it.

The lower sheet metal floor 80 is connected with the lower wall 52 of the intake conveyor 20 by means of a pin 98 extending vertically. The upper sheet metal cover 82 is also connected with the upper wall 54 of the intake conveyor 20 by means of a pin 100. The pins 98, 100 are arranged coaxially to each other and define a vertical axis 102 about which the front harvesting attachment take-up arrangement 76 can be pivoted relative to the housing of the intake conveyor 20. It does not make any difference whether the pins 98, 100 are connected rigidly or free to rotate with the sheet metal bottom 80 or the sheet metal cover 82 or the wall 52 or 54. A front harvesting attachment pivoting actuator 104, in the form of a double-acting hydraulic cylinder, is connected with its housing to a bracket 106 attached to a side wall of the intake conveyor 20 and with its piston rod to a retainer 108 fastened to a vertical carrier 78 of the front harvesting attachment take-up arrangement 76. In place of a hydraulic cylinder for front harvesting attachment pivoting actuator 104, a rotating hydraulic motor or an electric motor or a pneumatic cylinder could also be used.

As can be seen in FIGS. 2 and 3, the housing of the intake conveyor 20 includes side walls with a rear region 110 of material that is rigid in itself, such as sheet metal. The front regions of the side walls of the housing of the intake conveyor 20 are formed by expansion bellows 112 that can be drawn apart and pushed together.

Thereby the front harvesting attachment take-up arrangement 76 together with the front harvesting attachment 18 can be pivoted about the vertical axis 102 by means of an appropriate loading of the front harvesting attachment pivoting actuator 104, as is shown as an example in FIG. 3. Due to the opposite rotation as shown of the rear steerable devices 14 the results is a reduction in the outermost radius of the outer end of the front harvesting attachment 18 in contrast to a front harvesting attachment 18 not connected in joints free to rotate about the vertical axis 102 which simplifies the free-cutting of the corners of a field.

Figure 5:
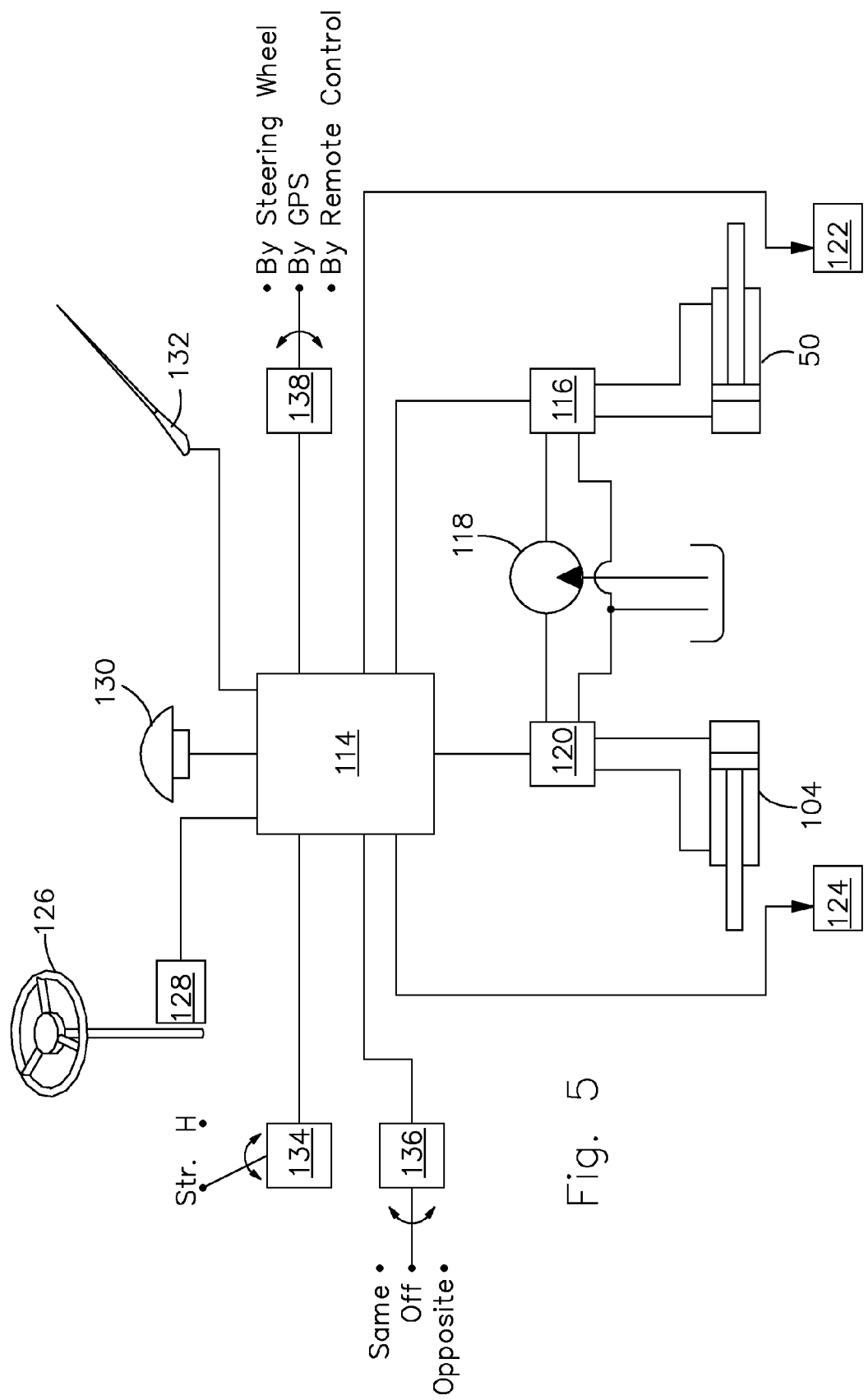
FIG. 5 shows a scheme of the control arrangement for the control of the steering actuator and the front harvesting attachment pivoting actuator.

FIG. 5 shows a scheme for the control of the steering actuator 50 and the front harvesting attachment pivoting actuator 104. An electronic control unit 114 is connected with a first electromagnetic valve arrangement 116. The electromagnetic valve arrangement 116 is connected in each case over a line with a pump 118 for the provision of pressurized hydraulic fluid and a hydraulic tank as well as with the piston chamber and the cylinder bottom chamber of the steering actuator 50. In addition, the electronic control unit 114 is connected with a second electromagnetic valve arrangement 120. The electromagnetic valve arrangement 116 is connected in each case over a line with a pump 118 for the supply of pressurized hydraulic fluid and a tank, as well as with the piston chamber and the cylinder bottom chamber of the front harvesting attachment pivoting actuator 104. A sensor 122 detects the position of the steering actuator 50 and transmits a signal to the control unit 114, the signal contains information regarding the position of the steering actuator 50. A sensor 124 detects the position of the front harvesting attachment pivoting actuator 104 and transmits a signal to the control unit 114 that contains information regarding the position of the front harvesting attachment pivoting actuator 104.

To provide the input for a desired direction of operation an operator input arrangement 126 is provided in the operator's cab 16 that takes the form of a steering wheel, whose angular position is detected by means of a steering angle sensor 128 and transmitted to the control unit 114. Moreover the control unit is connected with a position sensor 130 in the form of an antenna for the reception of positioning signals and receives signals from satellites, such as GPS or another appropriate positioning system. Moreover the control unit 114 is connected with an antenna 132 with which steering control information can be transmitted from a control station to the control unit 114.

Moreover the control unit 114 is connected with a switch 134 for switching between an operation on public streets (position "Str") and a harvesting operation (position "H") as well as a switch 136 that includes an off position, a position for rotation in the same direction of the front harvesting attachment 18 and the rear steerable devices 14 ("same"), and a position for rotation in opposite directions of the front harvesting attachment 18 and the rear steerable devices 14 ("opposite").

During the operation the control unit 114 controls the steering actuator 50 in a manner known in itself in such a way that a predetermined angle of the rear controllable devices 14 can be reached. The immediate target value is provided as input depending on the mode of operation selected by the operator by means of an input switch 138 in the operator's cab 16, the mode of operation provided by the operator is seen as input by the steering angle sensor 128 ("by steering wheel"), from the position sensor 130 ("by GPS"), in connection with a plan of the operation stored in memory in the control unit 114 or provided by means of the antenna 132 from a control station ("by remote control") and compared to an actual value that is detected by the sensor 122. The control unit 114 controls the position of the steering actuator 50 by a corresponding control of the valve arrangement 116 in such a way that the desired angle of the rear steerable devices 14 about the vertical axis 46 is reached.

The control unit 114 controls the front harvesting attachment pivoting actuator 104 by means of the valve arrangement 120 in such a way that the front harvesting attachment reaches its rest position shown in FIG. 2 when the switch 134 is in its position for operation on public roads. The control unit 114 also controls the front harvesting attachment pivoting actuator 104 by means of the valve arrangement 120 in such a way that the front harvesting attachment reaches its rest position, shown in FIG. 2, when the switch 136 is in the off position. Thereby the automatic pivoting of the front harvesting attachment 18 can be turned off in cases in which it is not desired, for example, during a long straight-ahead operation.

If the switch 134 is in the position for harvesting operation and the switch 136 in the position for opposite steering then the front harvesting attachment pivoting actuator 104 is pivoted by the control unit 114 by means of the valve arrangement 120 in such a way that the front harvesting attachment take-up arrangement 76 is pivoted about the axis 102 through an angle from the actual or the target value in the opposite direction of the angle of the rear devices 14 in contact with the ground to an opposite axis 102. The connection between the two angles mentioned is preferably proportional although non-proportional relationships are conceivable, such as quadratic, cubic or exponential relations between the increasing angles of the rear devices 14 in contact with the ground and the angles of the front harvesting attachment 76. The connection can be provided as a fixed input or it could be defined by the operator over an appropriate input arrangement (not shown), for example, the input of a proportionality factor. Here the actual position of the front harvesting attachment pivoting actuator 104 is detected by means of the sensor 124 and compared with its target position and the valve arrangement 120 is controlled in such a way that the target position is reached. The pivot angle of the front harvesting attachment take-up arrangement 76 from the rest position may also depend upon the forward operating velocity V and be smaller the higher the forward velocity is in order to avoid instabilities at higher speeds in the performance during the operation of the harvesting machine. In this operating mode, that is shown in FIG. 3, the harvesting machine can be moved through the corners of the field particularly easily.

The switch 134 may be placed in the position for harvesting operation and the switch 136 placed in the position for steering in the same direction. In this state the front harvesting attachment pivoting actuator 104 is controlled by the control unit 114 by means of the valve arrangement 120 in such a way that when the front harvesting attachment take-up arrangement 76 is pivoted about axis 102, the rear devices 14 are pivoted through an actual or target angle about the axis 46 through an equal angle in the same sense about the axis 102 as shown by dashed lines 14a in FIG. 3. The connection between the two angles mentioned is preferably established as described above. In this mode of operation, which represents a sort of crab steering, areas of a field that otherwise would be difficult to access can be harvested.

It would also be conceivable that a separate input arrangement be attached in the operator's cab with which the front harvesting arrangement pivoting actuator 104 can be controlled by the operator independently of the operator input arrangement 126. Then a fourth position would have to be added to the switch 136 in which the separate input arrangement for the control of the front harvesting arrangement pivoting actuator 104 would be active.

FIGS. 6 and 7 show a different embodiment of the invention for the intake conveyor 20. Elements that coincide with the first embodiment are identified with the same part number call-outs. A difference to the first embodiment lies in the fact that an oscillating frame is connected in joints, to the front side of the intake conveyor 20, free to pivot about the full floating axis. This full floating axle is formed by means of a pivot pin 140, that is fastened to the front side of the upper wall 54 so as to extend horizontally and in the forward direction V. The pivot pin 140 carries the oscillating frame 148 so as to pivot about its longitudinal axis. In place of the actual full floating axle, a virtual full floating axle could be provided and located by appropriate bearing arrangements in the center of the intake opening of the intake conveyor 20.

The oscillating frame 148 is provided with a lower wall 142, in which the vertical pin 98 is fastened, and an upper wall 144, in which the pin 100 is fastened, also extending vertically. A cylinder for an oscillating cylinder 146 for the production of pivoting movement is fastened at one end to the side wall 110 of the intake conveyor 20 and at its other end to the oscillating frame 148. The oscillating cylinder 146 is connected in a manner known in itself to a control arrangement that guides the front harvesting attachment 18 at a desired height or with a desired contact pressure across the ground. The lower wall 142 and the upper wall 144 are connected to each other by side walls 150.

In the second embodiment front harvesting attachment pivoting actuators 104 (configured as single-acting or double-acting hydraulic cylinders) extend—lying approximately in the center between the pin 100 that defines the vertical axis 102 and the side wall 150 of the oscillating frame 148—between a connecting point on the upper wall 144 of the oscillating frame 148 and a connecting a point on the outer side of the upper sheet metal cover 82 of the front harvesting attachment take-up arrangement 76. This embodiment could also be transferred analogously to the first embodiment. In both embodiments one of the front harvesting attachment pivoting actuators 104 could be omitted in each case between, the remaining actuator would then have to be double-acting.

In the second embodiment the first conveyor 56 is arranged in a trough, recessed into the sheet metal floor 80 of the front harvesting attachment take-up arrangement 76, it is configured as a driver roll that extends horizontally and parallel to the longitudinal axis of the bridges 85. It conveys the harvested crop in overhead manner. The first conveyor 56 may be driven by an articulated shaft from the shaft of the lower roll 66 of the second conveyor 58.

In both embodiments a mechanical connection (rope pull or the like) would also be possible between the steering actuator 50 and the front harvesting attachment take-up arrangement 76 that can be pivoted about the vertical axis, in place of the front harvesting attachment pivoting actuators 104.

Having described the preferred embodiment, it will become apparent that various modifications can be made without departing from the scope of the invention as defined in the accompanying claims.

The invention claimed is:

1. A self-propelled agricultural harvesting machine that is propelled in a normal forward operating direction and is provided with a chassis that includes a harvested crop processing arrangement arranged within the chassis and an intake conveyor arranged on the front side of the chassis, a front harvesting attachment take-up arrangement attached to said intake conveyor, and a front harvesting attachment for the take-up of harvested crop attached to the intake conveyor, wherein the front harvesting attachment take-up arrangement is pivoted by a front harvesting attachment pivoting actuator about a vertical axis relative to the chassis, said front harvesting attachment and said front harvesting take-up arrangement being closely coupled to said intake conveyor, wherein the chassis includes a pair of front devices in contact with the ground and wherein rear devices in contact with the ground are arranged behind the front devices in contact with the ground relative to the normal forward operating direction and are steered by means of a steering actuator, and the front harvesting attachment pivoting actuator is coupled so as to drive with the steering actuator, and wherein the steering actuator and the front harvesting attachment pivoting actuator are selectively coupled, in such a way that the front harvesting attachment take-up arrangement and the rear devices in contact with the ground are moved in opposite directions or in the same direction.

2. A harvesting machine according to claim 1, wherein the front harvesting attachment take-up arrangement is supported in bearings free to pivot about the vertical axis relative to the intake conveyor.

3. A harvesting machine according to claim 1, wherein the intake conveyor includes a first conveyor and a second conveyor arranged downstream of the first conveyor.

4. A harvesting machine according to claim 3, wherein the first conveyor is a roll with an axis of rotation extending horizontally and transverse to the normal forward direction.

5. A harvesting machine according to claim 3, wherein the second conveyor is a chain conveyor.

6. A harvesting machine according to claim 1, wherein an expansion bellows is located between the front harvesting attachment take-up arrangement and a side wall of the intake conveyor.

7. A harvesting machine according to claim 1, wherein the steering actuator and the front harvesting attachment pivoting actuator are connected with a control unit that contains as input magnitude signals from an operator input arrangement or an antenna connected to a wireless remote steering control or an automatic steering control with a position sensor or a harvested edge sensor.

8. A harvesting machine according to claim 1, wherein the mechanical coupling between the steering actuator and the front harvesting attachment pivoting actuator is capable of being turned off, particularly for operation on public roads.

* * * * *